United States Patent
Nakajima

(10) Patent No.: US 7,678,720 B2
(45) Date of Patent: Mar. 16, 2010

(54) GLASS CERAMICS COMPRISING BETA-QUARTZ OR BETA-QUARTZ SOLID SOLUTION

(75) Inventor: Kousuke Nakajima, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 0 days.

(21) Appl. No.: 11/545,513

(22) Filed: Oct. 11, 2006

(65) Prior Publication Data

US 2007/0093375 A1 Apr. 26, 2007

(30) Foreign Application Priority Data

Oct. 25, 2005 (JP) ............................. 2005-310050
Aug. 28, 2006 (JP) ............................. 2006-230235

(51) Int. Cl.
*C03C 10/14* (2006.01)
*C03C 10/12* (2006.01)

(52) U.S. Cl. ............................................. 501/4; 501/7

(58) Field of Classification Search ................. 501/4, 501/7
See application file for complete search history.

(56) References Cited

U.S. PATENT DOCUMENTS

| 3,490,984 | A | | 1/1970 | Petticrew et al. | |
|---|---|---|---|---|---|
| 3,642,504 | A | | 2/1972 | Petzold et al. | |
| 6,635,591 | B2 | * | 10/2003 | Nagata et al. | 501/3 |
| 6,677,046 | B2 | * | 1/2004 | Hachitani et al. | 428/426 |
| 7,091,141 | B2 | * | 8/2006 | Horsfall et al. | 501/4 |
| 7,220,690 | B2 | * | 5/2007 | Mitra et al. | 501/4 |
| 7,226,881 | B2 | * | 6/2007 | Goto | 501/4 |
| 2001/0056024 | A1 | * | 12/2001 | Nagata et al. | 501/9 |
| 2001/0056025 | A1 | * | 12/2001 | Nagata et al. | 501/9 |
| 2001/0056026 | A1 | * | 12/2001 | Nagata et al. | 501/9 |
| 2001/0056027 | A1 | * | 12/2001 | Nagata et al. | 501/9 |
| 2007/0281849 | A1 | * | 12/2007 | Yagi et al. | 501/4 |
| 2007/0293386 | A1 | * | 12/2007 | Goto | 501/4 |

FOREIGN PATENT DOCUMENTS

| EP | 1193227 | A1 | | 4/2002 |
|---|---|---|---|---|
| EP | 1391439 | A | | 2/2004 |
| EP | 1516863 | A | | 3/2005 |
| JP | 63242945 | | * | 10/1988 |
| WO | WO 2006/080557 | A | | 8/2006 |

OTHER PUBLICATIONS

S. Priller et al: "Strengthening of glass through surface crystallization of Beta-Spodumene ss" Journal of non- crystalline solids, North-Holland Physics publishing, Amsterdam, NL, vol. 196, Mar. 1996, pp. 144-149, XP004079420.
European Search Report dated Feb. 2, 2007, issued in corresponding European Application No. 06-12-1910.
Patent Abstract of German, Publication No. DE1902432, dated Sep. 17, 1970.
Patent Abstract of Japan, Publication No. 08-133783, dated May 28, 1996.
Patent Abstract of Japan, Publication No. 2005-063949, dated Mar. 10, 2005.
Patent Abstract of Japan, Publication No. 2005-089272, dated Apr. 7, 2005.
Patent Abstract of Japan, Publication No. 2005-231994, dated Sep. 2, 2005.

* cited by examiner

*Primary Examiner*—Karl E Group
(74) *Attorney, Agent, or Firm*—Westerman, Hattori, Daniels & Adrian, LLP

(57) ABSTRACT

Glass-ceramics includes $Li_2O$, $Al_2O_3$ and $SiO_2$, have an average crystal grain diameter of a predominant crystal phase of 90 nm or below and have crystal grain diameter distribution of 20 nm or below. The glass-ceramics can be manufactured by heat treating glass comprising $Li_2O$, $Al_2O_3$ and $SiO_2$ under a temperature within a range from 650° C. to 750° C. and then further heat treating the glass under a temperature within a range from 700° C. to 800° C. for 100-200 hours.

11 Claims, 5 Drawing Sheets

GLASS CERAMICS COMPRISING BETA-QUARTZ OR BETA-QUARTZ SOLID SOLUTION

BACKGROUND OF THE INVENTION

This invention relates to glass-ceramics having a super flat polished surface and a ultra low thermal expansion property capable of being used as a substrate for a mirror used for super precision purposes such as a next generation semiconductor manufacturing equipment and also relates to a method for manufacturing such glass-ceramics.

In recent years, efforts have been actively made for development of a next generation semiconductor exposure techniques intended for realizing higher density integration of circuits on IC chips.

For realizing a higher density integration of circuits on IC chips, efforts are generally made for achieving finer exposure resolution which is expressed as R: exposure resolution represented by the formula $R=k\times(\lambda/NA)$ (where k is a constant, $\lambda$ is exposure wavelength and NA is numerical aperture). It is a recent tendency to make an attempt for realizing finer exposure resolution by shortening the exposure wavelength.

There has actually been shifting in the exposure wavelength from so-called i-line (467 nm) and g-line (365 nm) to excimer lasers such as a KrF laser (248 nm) and an ArF laser (193 nm). Further, it has recently been made possible to realize a fine width of exposure line in the order of 45 nm (so-called "45 nm node") as the minimum width of exposure line by adopting liquid immersion exposure technique which shortens apparent exposure wavelength by filling pure water in space between an objective lens and a silicon wafer which is an object to be exposed, or by combining with super resolution techniques such as OPC (optical proximity correction) or PSM (phase shift mask).

However, for coping with realizing a finer width of exposure line with the liquid immersion technique in a coming 32 nm node generation which will follow the 45 nm node generation, a liquid which has a larger refractive index than pure water and which will not contaminate other exposure system must be developed. Moreover, the super resolution techniques will become more complex than in the present stage, which will incur increase in the cost for exposure.

Extreme ultraviolet ray exposure technique (EUVL) using extreme ultraviolet ray as a light source uses light having wavelength of only 13 nm which is very short compared with light used in the conventional optical lithography and the exposure resolution represented by R can thereby be made very small. For this reason, EUVL is thought to be a hopeful exposure technique in the coming 32 nm mode and subsequent generations.

Since the wavelength used in EUVL is a very short one of 13 nm and has a large absorption coefficient to lens materials used in the current optical lithography, such optical system needs to employ not a transmitted light system which has been used in the conventional optical lithography but a reflected light system using a mirror.

In the reflected light system which can be used in EUVL, if a projected image on the mirror surface is distorted due, for example, to thermal expansion of a substrate material, it will ultimately result in deterioration in the exposure quality. It is therefore necessary to use a material having an extremely small thermal expansion coefficient as substrates of a mirror and a photo mask used in EUVL.

Further, super flatness of an atom level, i.e., Rms of a component having coarseness expressed by spatial frequency of 10 μm or below is 0.15 nm or below sa described in literature (SEMI P37-1102), is sought for a surface of substrates of such mirror and photo mask used in the reflected light system of EUVL.

For coping with this problem, it is conceivable to use titan-dope silica glass produced by vapor phase synthesis or ultra low thermal expansion glass-ceramics as a substrate material. However, titan-dope silica glass which is currently commercially available has inhomogeneity in its composition caused during the vapor phase synthesis and, as a result, the thermal expansion coefficient on the surface of the material becomes inhomogeneous and therefore is unsuitable for a substrate of a mirror used in EUVL which is required to have severe CTE homogeneity in the order of a ppb/K level.

Glass-ceramics having β-quartz crystal as a predominant crystal phase which are produced by heat treating a $Li_2O$—$Al_2O_3$—$SiO_2$ system glass exhibits an ultra low thermal expansion property and a fine structure of a submicron order and, advantageously, is mostly produced by a melting process. For these reasons, the glass-ceramics are superior in optical homogeneity to the above described titan-dope silica glass.

In a case where such ultra low thermal expansion glass-ceramics are used as a mirror substrate, their surface roughness after polishing generally depends upon crystal grain diameter of the glass-ceramics and, therefore, the surface roughness after polishing is expected to be made smaller by making the average crystal grain diameter. Since, however, polished surfaces of the EUVL mirror and photo mask substrate require super flatness as mentioned above, it will not suffice to consider only the average crystal grain diameter of the glass-ceramics.

Since the average crystal grain diameter is an average value of crystal grain diameters of glass-ceramics, even if a crystal grain having an extraordinarily large diameter exists in the glass-ceramics, this extraordinarily large crystal grain diameter is averaged with crystal grain diameters of other crystal grains in the glass-ceramics and, therefore, its existence will not significantly affect the average crystal grain diameter of the glass-ceramics. On the other hand, so far as surface roughness after polishing of the glass-ceramics is concerned, a peak to valley value of projections and depressions on the surface of the glass-ceramics will become large by existence of the crystal grain having such extraordinarily large crystal grain diameter and, as a result, the glass-ceramics will not be suitable for use as substrates for super precision purposes such as the EUVL mirror.

Accordingly, in developing glass-ceramics to be used as a substrate material of the EUVL mirror or photo mask substrate, not only an average crystal grain diameter but also a state of distribution of crystal grain diameters need to be controlled.

Japanese Patent Application Laid-open Publication No. 2005-089272 discloses ultra low thermal expansion glass-ceramics having ultra low thermal expansion property and transparency obtained by heat treating a $Li_2O$—$Al_2O_3$—$SiO_2$ glass containing $TiO_2$ and $ZrO_2$ as crystal precipitating agents. The glass-ceramics have surface roughness Ra of a polished surface of 0.3 nm or below.

This publication describes about an average crystal grain diameter within a range of 50 nm-90 nm as a factor for achieving flatness of the glass-ceramics but fails to discuss distribution of crystal grain diameters.

The inventor of the present invention has measured the distribution of crystal grain diameter of the examples of this publication and found that the examples all have substantially large distribution of crystal grain diameters and, therefore, there still is room for improvement in the glass-ceramics of the publication when utility of the glass-ceramics as a substrate material for the EUVL mirror or photo mask substrate is considered.

Japanese Patent Application Laid-open Publication No. 2005-063949 discloses ultra low thermal expansion glass-ceramics obtained by heat treating a $Li_2O$—$Al_2O_3$—$SiO_2$ glass containing $TiO_2$ and $ZrO_2$ as crystal precipitating agents. It is described that the glass-ceramics have a variation coefficient (distribution of crystal grain diameter/average crystal grain diameter shown by percentage) of 10% or below. Since, however, the average crystal grain diameter of the glass-ceramics spans a very wide range of 100 nm to 1000 nm and, moreover, no discussion is made about the surface roughness after polishing, utility of the glass-ceramics as a substrate material of the EUVL mirror or photo mask substrate is not clear.

Japanese Patent Application Laid-open Publication No. 2003-267789 discloses glass-ceramics having ultra low thermal expansion property and a variable CTE-T curve obtained by heat treating a $Li_2O$—$Al_2O_3$—$SiO_2$ glass containing $TiO_2$ and $ZrO_2$ as crystal precipitating agents. It is described that the value of CTE is variable as a result of adjustments in heat treatment temperature and time taken for crystallization in the crystallization process. Since, however, no discussion is made in the publication about the size of crystal grain diameter and distribution of crystal grain diameters and also surface roughness after polishing of the glass-ceramics, utility of the glass-ceramics as a substrate material of the EUVL mirror or photo mask substrate is not clear.

It is an object of the present invention to provide glass-ceramics having super flat surface roughness and ultra low thermal expansion property which have not been realized to date.

It is another object of the invention to provide a method for manufacturing such glass-ceramics.

SUMMARY OF THE INVENTION

It is generally known that, as the crystal grain diameter of the glass-ceramics increases, surface roughness of a polished surface also increases. Since super flatness and low defectiveness in the order of atom level are required as the surface roughness of a polished surface in a substrate material for purposes such as the EUVL mirror and photo mask substrate, distribution of crystal grain diameters as well as average crystal grain diameter must be made small for such substrate material.

For controlling the crystal grain diameter and distribution of crystal grain diameters, two ways are conceivable. One way is to control temperature for crystallization and the other way is to control length of time taken for crystallization. In the former, control of the temperature for crystallization affects directly growth and aggregation of crystals which form the magnitude of crystal grain diameter and distribution of crystal grain diameters with the result that even a slight change in the temperature causes large variation in the magnitude of crystal grain diameter and distribution of crystal grain diameters. Moreover, in this method, in a case where a range of control is small relative to the temperature distribution performance of the furnace used for crystallization, such temperature control is substantially impossible. In contrast, in the latter method, i.e., the method of controlling length of time taken for crystallization, which the present invention has adopted, the magnitude of crystal grain diameter and distribution of crystal grain diameters are controlled by changing length of time taken for crystallization while maintaining a constant temperature. Accordingly, in the latter method, excessive growth and aggregation of crystals which tend to take place in the former method and limitation by the temperature distribution performance of the furnace used for crystallization in the former method are eliminated and, as a result, a more accurate control than the former method can be expected.

Studies and experiments made by the inventor of the present invention have resulted in the finding, which has led to the present invention, that, by causing very fine crystal grains to precipitate in glass-ceramics having a specific composition comprising $Li_2O$, $Al_2O$ and $SiO_2$ and controlling distribution of crystal grain diameters of the glass-ceramics to a specific range by adopting the above described latter method, glass-ceramics having a super flat polished surface and ultra low thermal expansion property which can be used for a mirror substrate for super precision purposes can be obtained.

According to the first aspect of the invention, there are provided glass-ceramics comprising $Li_2O$, $Al_2O_3$ and $SiO_2$, having an average crystal grain diameter of a predominant crystal phase of 90 nm or below and having crystal grain diameter distribution of 20 nm or below.

In the second aspect of the invention, there are provided glass-ceramics as defined in the first aspect having an average linear thermal expansion coefficient within a range of $0.0\pm0.2\times10^{-7}/°C$. within a temperature range from 0° C. to 50° C.

In the third aspect of the invention, there are provided glass-ceramics as defined in the first or second aspect comprising β-quartz and/or β-quartz solid solution as a predominant crystal phase.

In the fourth aspect of the invention, there are provided glass-ceramics as defined in any of the first to the third aspects wherein a surface roughness Rms of a polished surface based on spatial wavelength of 10 μm or below is 0.2 nm or below.

In the fifth aspect of the invention, there are provided glass-ceramics as defined in any of the first to the fourth aspects comprising, in mass %,

| | |
|---|---|
| $SiO_2$ | 47-65% |
| $P_2O_5$ | 1-13% |
| $Al_2O_3$ | 17-29% |
| $Li_2O$ | 1-8% |
| MgO | 0.5-5% |
| ZnO | 0.5-5.5% |
| $TiO_2$ | 1-7% and |
| $ZrO_2$ | 1-7%. |

In the sixth aspect of the invention, there are provided glass-ceramics as defined in any of the first to the fifth aspects comprising, in mass %,

| | |
|---|---|
| $Na_2O$ | 0-4% and/or |
| $K_2O$ | 0-4% and/or |
| CaO | 0-7% and/or |
| BaO | 0-7% and/or |
| SrO | 0-4% and/or |
| $As_2O_3$ | 0-2% and/or |
| $Sb_2O_3$ | 0-2%. |

In the seventh aspect of the invention, there are provided glass-ceramics as defined in any of the first to the sixth aspects wherein a total amount of $SiO_2+Al_2O_3+P_2O_5$ in mass % is within a range from 65.0 to 93.0, the ratio of $P_2O_5/SiO_2$ is within a range from 0.02 to 0.200 and the ratio of $P_2O_5/Al_2O_3$ is within a range from 0.059 to 0.448.

In the eighth aspect of the invention, there are provided glass-ceramics as defined in any of the first to the seventh aspects obtained by heat treating glass under a temperature within a range from 650° C. to 750° C. and then further heat treating the glass for second heat treatment under a temperature within a range from 700° C. to 800° C. for 100-200 hours.

In the ninth aspect of the invention, there are provided glass-ceramics as defined in any of the first to the eighth aspects obtained by heat treating glass for first heat treatment under a temperature within a range from 650° C. to 750° C. for 20-60 hours and then further heat treating the glass for second heat treatment under a temperature within a range from 700° C. to 800° C. for 100-200 hours.

In the tenth aspect of the invention, there is provided a substrate using the glass-ceramics as defined in any of the first to the ninth aspects.

In the eleventh aspect of the invention, there is provided a photo-mask using the substrate as defined in the tenth aspect.

In the twelfth aspect of the invention, there is provided a mirror using the substrate as defined in the tenth aspect.

In the thirteenth aspect of the invention, there is provided a method for manufacturing glass-ceramics comprising steps of heat treating glass comprising $Li_2O$, $Al_2O_3$ and $SiO_2$ under a temperature within a range from 650° C. to 750° C. and then further heat treating the glass under a temperature within a range from 700° C. to 800° C. for 100-200 hours.

In the fourteenth aspect of the invention, there is provided a method for manufacturing glass-ceramics as defined in the thirteenth aspect comprising steps of heat treating glass comprising $Li_2O$, $Al_2O_3$ and $SiO_2$ under a temperature within a range from 650° C. to 750° C. for 20-60 hours and then further heat treating the glass under a temperature within a range from 700° C. to 800° C. for 100-200 hours.

In the fifteenth aspect of the invention, there is provided a method for manufacturing glass-ceramics as defined in the thirteenth or fourteenth aspect wherein the glass comprising $Li_2O$, $Al_2O_3$ and $SiO_2$ comprises, in mass %,

| | |
|---|---|
| $SiO_2$ | 47-65% |
| $P_2O_5$ | 1-13% |
| $Al_2O_3$ | 17-29% |
| $Li_2O$ | 1-8% |
| MgO | 0.5-5% |
| ZnO | 0.5-5.5% |
| $TiO_2$ | 1-7% |
| $ZrO_2$ | 1-7% and |
| $Na_2O$ | 0-4% and/or |
| $K_2O$ | 0-4% and/or |
| CaO | 0-7% and/or |
| BaO | 0-7% and/or |
| SrO | 0-4% and/or |
| $As_2O_3$ | 0-2% and/or |
| $Sb_2O_3$ | 0-2%. |

In the sixteenth aspect of the invention, there is provided a method for manufacturing glass-ceramics as defined in any of the thirteenth to the fifteenth aspect wherein the glass comprising $Li_2O$, $Al_2O_3$ and $SiO_2$ has a composition in which a total amount of $SiO_2+Al_2O_3+P_2O_5$ in mass % is within a range from 65.0 to 93.0, the ratio of $P_2O_5/SiO_2$ is within a range from 0.02 to 0.200 and the ratio of $P_2O_5/Al_2O_3$ is within a range from 0.059 to 0.448.

Since the composition of glass-ceramics of the present invention is expressed in mass %, it cannot be expressed directly in mol %. If the composition performing a similar function is expressed in mol %, it will be generally the following composition ranges.

That is to say, in the seventeenth aspect of the invention, there are provided glass-ceramics as defined in any of the first to the fourth aspects comprising, in mol %,

| | |
|---|---|
| $SiO_2$ | 57.2-72.7% |
| $P_2O_5$ | 1.5-4.9% |
| $Al_2O_3$ | 12.8-18.4% |
| $Li_2O$ | 4.6-16.2% |
| MgO | 0.9-6.9% |
| ZnO | 0.4-3.4% |
| $TiO_2$ | 0.9-3.5% and |
| $ZrO_2$ | 0.6-2.2%. |

In the eighteenth aspect of the invention, there are provided glass-ceramics as defined in any of the first to the fifth and the seventeenth aspects comprising, in mol %,

| | |
|---|---|
| $Na_2O$ | 0-2.2% and/or |
| $K_2O$ | 0-1.5% and/or |
| CaO | 0-6.2% and/or |
| BaO | 0-2.3% and/or |
| SrO | 0-2.0% and/or |
| $As_2O_3$ | 0-0.4% and/or |
| $Sb_2O_3$ | 0-0.2%. |

In the present specification, the term "glass-ceramics" means a material which is obtained by causing crystalline to precipitate in a glass phase by heat treating a glass and which consists of an amorphous solid and crystalline.

In the present specification, the term "average crystal grain diameter" means an average value of crystal grain diameters obtained by visual inspection of crystal grains of a transmission electron microscopic photograph. The term "crystal grain diameter distribution" means standard deviation of crystal grain diameters. Visual calculation constant in this case is 30 or more.

In the present specification, the term "predominant crystal phase" means all crystal phases which have a relatively large ratio of precipitation. More specifically, "predominant crystal phase" includes all crystal phases each of which, when X-ray diffraction intensity of "a crystal phase which has the largest ratio of precipitation" or "a main peak (the highest peak) of a crystal phase which has the largest ratio of precipitation in an X-ray chart of X-ray diffraction (the vertical axis representing X-ray diffraction intensity and the horizontal axis representing diffraction angle) is assumed to be 100, has a mean peak (the highest peak in the crystal phase) whose ratio of X-ray diffraction intensity (hereinafter referred to as "X-ray diffraction intensity ratio") is 30 or over. X-ray diffraction intensity ratios of crystal phases other than the predominant crystal phases should preferably be less than 20 and, more preferably less than 10 and most preferably, less than 5.

In the present specification, the term "surface roughness Rms" means square mean surface roughness of the surface to be measured. Specifically, Rms is square mean roughness measured by an atomic force microscope with a view of field of 10 μm×10 μm.

Since Rms is generally used in describing surface roughness in the field of art for which the glass-ceramics of the present invention are used, particularly for the uses of EUVL reflected light system, the surface roughness Rms is used in the present specification. If the surface roughness is expressed by using Ra (arithmetic mean roughness), it will generally become a smaller value than Rms.

According to the invention, by controlling average crystal grain diameter and crystal grain diameter distribution of precipitating crystals to an optimum level, surface roughness which realizes a super flat surface can be achieved. More specifically, according to the present invention, surface roughness Rms of a polished surface based on spatial wavelength of 10 μm or below will become 0.2 nm or below, more preferably 0.18 nm or below and, most preferably, 0.15 nm or below.

Further, by polishing glass-ceramics obtained by the present invention, a substrate suitable for a mirror or a photo mask used in the EUVL reflected light system can be obtained and an excellent mirror or photo mask for EUVL can be obtained by using this substrate.

BRIEF DESCRIPTION OF THE DRAWINGS

In the accompanying drawings.

DESCRIPTION OF PREFERRED EMBODIMENTS

Figure 1:
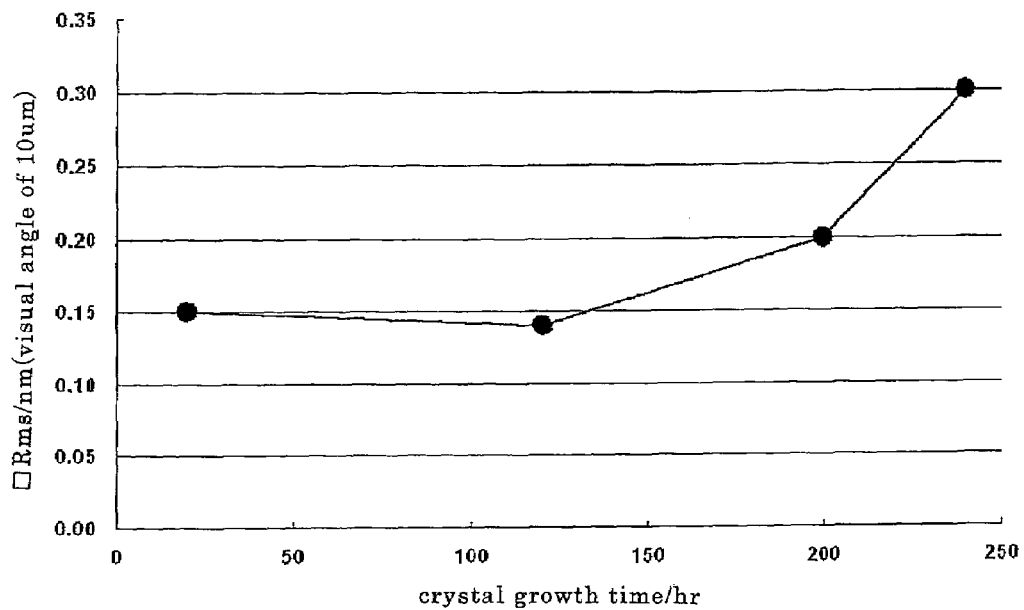
FIG. 1 is a graph showing relationship between crystallization time and surface roughness Rms of the composition of glass-ceramics of Example 1.

Reasons for limiting the thermal and physical properties, predominant crystal phases, average crystal grain diameter, crystal grain diameter distribution, surface property and composition of the glass-ceramics of the invention as described above will be described below.

As regards the average linear thermal expansion coefficient, as described above, in the semiconductor manufacturing equipment and super precision instruments, a thermal expansion property of a material capable of coping with higher accuracy is required. For this reason, the material should preferably have an average linear thermal expansion coefficient within a range of $0.0\pm0.2\times10^{-7}/°$ C. and more preferably within a range of $0.0\pm0.1\times10^{-7}/°$ C. within a temperature range from 0° C. to 50° C.

The average crystal grain diameter is one of factors which contribute to flatness of the surface after polishing. For achieving desired flatness of the surface, an average crystal grain diameter of precipitating crystals should preferably be 90 nm or below, more preferably 80 nm or below and, most preferably, 70 nm or below.

The crystal grain diameter distribution is as important a factor as the average crystal grain diameter for achieving flatness of the surface after polishing. For achieving desired flatness of the surface, the crystal grain diameter distribution of precipitating crystals should preferably be 20 nm or below, more preferably 18 nm or below and, most preferably, 15 nm or below.

Reasons for limiting the respective components to the above described amounts will now be described. Unless specifically described, the amount of the respective components is expressed in mass %.

As regards the predominant crystal phase which precipitates in the glass-ceramics, this is an important factor which determines the average linear thermal expansion coefficient. In the glass-ceramics of the present invention, the average linear thermal expansion coefficient of the glass-ceramics as a whole within a desired range is achieved by producing a predominant crystal phase having a negative average linear thermal coefficient. For this purpose, the glass-ceramics should preferably comprise β-quartz (β-$SiO_2$) or β-quartz solid solution (β-$SiO_2$ solid solution) as the predominant crystal phase. In the present specification, "β-quartz solid solution" means β-quartz containing an interstitial and/or substitutional element or elements other than Si and O and includes β-eucryptite (β-$Li_2O.Al_2O_3.2SiO_2$) and/or β-eucryptite solid solution (β-$Li_2O.Al_2O_3.2SiO_2$ solid solution) petalite (β-$Li_2O.Al_2O_3.8SiO_2$) and/or petalite solid solution (β-$Li_2O.Al_2O_3.8SiO_2$ solid solution). In the glass-ceramics of the present invention, in particular, a preferable β-quartz solid solution is a crystal in which equilibrium is maintained by substitution of $Si^{+4}$ atoms by $Al^{+3}$ atoms and addition of $Li^+$, $Mg^{+2}$ and $Zn^{+2}$ atoms.

When β-spodumene (β-$Li_2O.Al_2O_3.4SiO_2$) or β-spodumene solid solution (β-$Li_2O.Al_2O_3.4SiO_2$ solid solution) precipitates as a predominant crystal phase, the glass-ceramics have a positive thermal expansion and, therefore, the average linear thermal expansion coefficient of the present invention cannot be realized. For this reason, β-spodumene or β-spodumene solid solution should preferably not be contained in the glass-ceramics.

The $SiO_2$ component is a very important component which produces the above described crystal as the predominant crystal phase by heat treating the base glass. If the amount of this component is 47% or over, the crystal precipitating in the glass-ceramics produced is stable and its texture hardly becomes coarse and, as a result, mechanical strength of the glass-ceramics is improved and the surface roughness after polishing of the glass-ceramics becomes small. If the amount of this component is 65% or below, melting and forming of the base glass are easy and homogeneity of the glass-ceramics is increased. For achieving these effects more easily, a preferable lower limit of the amount of this component is 54% and a more preferable lower limit is 54.5%. Likewise, a preferable upper limit of this component is 56%, and a more preferable upper limit is 55.8%.

The $P_2O_5$ component is effective, when it coexists with the $SiO_2$ component, for improving the melting property and clarity of the base glass and also for stabilizing the thermal expansion property after crystallization by the heat treatment to a desired value. In the glass-ceramics of the present invention, if the amount of the $P_2O_5$ component is 1% or over, these effects sharply increase and, if the amount of this component is 13% or below, the base glass has excellent resistance to devitrification and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this component is 6% and a more preferable lower limit is 6.5%. Likewise, a preferable upper limit of this component is 8.5%, and a more preferable upper limit is 8.3%.

If the amount of the $Al_2O_3$ component is within a range from 17% to 29%, melting of the base glass becomes easy and, as a result, homogeneity of the glass-ceramics produced is improved and chemical durability of the glass-ceramics becomes excellent. Further, if the amount of this component is 29% or below, resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this component is 22% and a more preferable lower limit is 23.5%. Likewise, a preferable upper limit of this component is 26.5%, and a more preferable upper limit is 25.5%.

If the total amount of $SiO_2$, $Al_2O_3$ and $P_2-O_5$ is 65.0%-93.0%, the ratio in mass % of $P_2O_5$ to $SiO_2$ is 0.02-0.200, and the ratio in mass % of $P_2O_5$ to $Al_2O_3$ is 0.059-0.448, the low thermal expansion property within the temperature range from 0° C. to 50° C. is significantly improved to achieve the ultra low thermal expansion property. For achieving this effect more easily, a preferable lower limit of the total amount of $SiO_2$, $Al_2O_3$ and $P_2-O_5$ is 82.0% and a more preferable lower limit of the total amount is 84.5%. A preferable lower limit of the ratio in mass % of $P_2O_5$ to $SiO_2$ is 0.111 and a more preferable lower limit thereof is 0.119. A preferable lower limit of the ratio in mass % of $P_2O_5$ to $Al_2O_3$ is 0.273 and a more preferable lower limit thereof is 0.277. A preferable upper limit of the total amount of $SiO_2$, $Al_2O_3$ and $P_2-O_5$ is 91.0% and a more preferable upper limit thereof is 89.6%. A preferable upper limit of the ratio in mass % of $P_2O_5$ to $SiO_2$ is 0.152 and a more preferable upper limit is 0.149. A preferable upper limit of the ratio in mass % of $P_2O_5$ to $Al_2O_3$ is 0.360 and a more preferable upper limit is 0.340.

The three components of $Li_2O$, MgO and ZnO are important components which constitute β-quartz solid solution. Further, these components are important in that, when these components coexist with the $SiO_2$ and $P_2O_5$ components within the specific composition ranges, these components improve the low thermal expansion property of the glass-ceramics and reduce deflection at a high temperature of the glass-ceramics, and, moreover, significantly improve the melting property and clarity of the base glass.

If the amount of the $Li_2O$ component is 1% or over, the above described effects sharply increase and homogeneity of the base glass is greatly improved by the improvement in the melting property of the glass. Further, precipitation of the desired crystal phase sharply increases. If the amount of this component is 8% or below, the low thermal expansion property is sharply improved to enable the ultra low thermal expansion property to be readily achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this component is 3.0% and a more preferable lower limit is 3.2%. Likewise, a preferable upper limit of this component is 4.5% and a more preferable upper limit is 4.1%.

In the amount of the $Na_2O$ component or the $K_2O$ component is 4% or below, it will contribute to improvement of the melting property of the base glass. If the amount thereof exceeds 4%, the component will be solved solidly in a crystal phase which will precipitate in the crystallization process and, as a result, a desired crystal phase will fail to be obtained or an undesired crystal phase will precipitate simultaneously with a desired crystal phase with resulting difficulty in achieving a desired thermal expansion property. For obtaining such effects more easily, a preferable lower limit of each of these components is 0%, and a more preferable lower limit is 1%. A preferable upper limit of each of these components is 3% and a more preferable upper limit is 2%.

If the amount of the MgO component is 0.5% or over, the above described effects sharply increase and, if the amount of this component is 5% or below, the low thermal expansion property is sharply improved and the ultra low thermal expansion property thereby can be achieved. For achieving these effects more easily, a preferable lower limit of the amount of this component is 0.6% and a more preferable lower limit is 0.8%. Likewise, a preferable upper limit of this component is 1.4% and a more preferable upper limit is 1.3%.

If the amount of the ZnO component is 0.5% or over, the above described effects sharply increase and, if the amount of this component is 5.5% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable lower limit of the amount of this component is 0.6% and a more preferable lower limit is 0.7%%. Likewise, a preferable upper limit of this component is 1.5% and a more preferable upper limit is 1.3%.

The three components of CaO, BaO and SrO remain as glass matrix which is a portion of the glass-ceramics other than the crystal precipitating in the glass-ceramics. These components may be added as components which perform fine adjustment between the crystal phase and the glass-matrix for improvement in the ultra low thermal expansion property and the melting property.

The CaO component is an optional component having the melting and clarifying effects. For achieving these effects more effectively, a preferable lower limit of this component is 0.6% and a more preferable lower limit is 0.7%. If the amount of this component is 7% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable upper limit of this component is 1.7% and a more preferable upper limit is 1.3%.

The BaO component is an optional component having the melting and clarifying effects. For achieving these effects more effectively, a preferable lower limit of this component is 0.6% and a more preferable lower limit is 0.7%. If the amount of the BaO component is 7% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable upper limit of this component is 1.4% and a more preferable upper limit is 1.3%.

The SrO component is an optional component having the melting and clarifying effects. For achieving these effects more effectively, a preferable lower limit of this component is 0.5%. If the amount of the SrO component is 4% or below, the low thermal expansion property is sharply improved to enable the ultra low thermal expansion property to be achieved, and resistance to devitrification of the base glass is improved and this prevents the texture of the glass-ceramics from becoming coarse due to decrease in resistance to devitrification during the crystallizing process and, as a result, the mechanical strength of the glass-ceramics is improved. For achieving these effects more easily, a preferable upper limit of this component is 1.5% and a more preferable upper limit is 1.0%.

The TiO and $ZrO_2$ components are indispensable as nucleating agents. If the amounts of these component are respectively 1.0% or over, precipitation of the desired crystal phase becomes possible. If the amounts of these components are respectively 7% or below, occurrence of unmelted portion of the glass is prevented with resulting increase in the melting property and improvement in homogeneity of the glass. For achieving these effects more easily, a preferable lower limit of the $TiO_2$ component is 1.7% and a more preferable lower limit is 1.9%. A preferable lower limit of the $ZrO_2$ component is 1.3% and a more preferable lower limit is 1.6%. A preferable upper limit of the $TiO_2$ component is 2.9% and a more preferable upper limit is 2.8%. A preferable upper limit of the $ZrO_2$ component is 2.7% and a more preferable upper limit is 2.4%.

The $As_2O_3$ component or the $Sb_2O_3$ component may be added as a refining agent during melting of the glass materials for achieving a homogeneous product. For achieving this effect, a preferable upper limit of each of these components is 2%. A more preferable range of each of these components is from 0.5% to 1.0%.

In addition to the above described components, one or more of $B_2O_3$, $F_2$, $La_2O_3$, $Bi_2O_3$, $WO_3$, $Y_2O_3$, $Gd_2O_3$ and $SnO_2$ may be added in a total amount of 2% or below for the purpose of fine adjustment of properties of the glass-ceramics and within a range in which the properties of the glass-ceramics are not impaired. One or more coloring components such as CoO, NiO, $MnO_2$, $Fe_2O_3$ and $Cr_2O_3$ may also be added in a total amount of 2% or below. In a case, however where the glass-ceramics of the present invention are used for a purpose which requires a high light transmittance, these coloring components should preferably be not included.

In the glass-ceramics of the present invention, a predominant crystal phase having a negative average linear thermal expansion coefficient is caused to precipitate and, by combination of this predominant crystal phase with a glass matrix phase having a positive average linear thermal expansion coefficient, glass-ceramics having an ultra low thermal expansion property as a whole are realized. For this purpose, the glass-ceramics should preferably not contain crystal phases which have a positive average linear thermal coefficient such as lithium disilicate, lithium silicate, α-quartz, α-cristobalite, α-tridymite, wollastonite, forsterite, diopside, nepheline, clinoenstatite, anorthite, celsian, gehlenite, feldspar, willemite, mullite, corundum, rankinite, larnite and solid solutions of these crystals. Further, for maintaining excellent mechanical strength, the glass-ceramics should preferably not contain Hf-tangstate, Zr-tangstate and other tangstates, magnesium titanate, barium titanate, manganese titanate and other titanates, mullite, $2Ba3SiO_2$, $Al_2O_3.5SiO_2$ and solid solutions of these crystals.

The ultra low thermal expansion transparent glass-ceramics of the present invention are manufactured by the following process.

Glass materials are weighed and mixed and put in a crucible and melted at a temperature within a range from about 1500° C. to 1600° C. to provide a base glass.

After obtaining the base glass by melting of the raw materials, the base glass is formed to a desired shape by casting in a mold and/or hot forming.

Then, the base glass is subjected to heat treatment for producing glass-ceramics. First, the base glass is held, for nucleation, at a temperature within a range from 650° C. to 750° C., preferably 680° C. in the lower limit and/or 720° C. in the upper limit.

Time length for the heat treatment during this nucleating process should preferably be 20 hours to 60 hours. A more preferable lower limit of time length for the heat treatment during the nucleating process is 25 hours and the most preferable lower limit is 30 hours. Likewise, a more preferable upper limit of time length for the heat treatment during the nucleating process is 55 hours and the most preferable upper limit is 50 hours.

After nucleation, the base glass is crystallized at a temperature within a range from 700° C. to 800° C., more preferably within a range from 750° C. to 790° C. If the temperature is lower than 700° C., the predominant crystal phase does not grow sufficiently whereas if the temperature is higher than 800° C., the base glass tends to be deformed due to softening or remelted. By crystallizing the glass at a temperature within a range from 750° C. to 790° C., sufficient growth of the predominant crystal phase can be achieved and likelihood of softening or remelting is substantially reduced.

In the glass-ceramics of the present invention, a desirable range of crystallization temperature, i.e., a range of crystallization temperature in the vicinity of the lowest temperature of heat treatment for crystal growth, differs depending upon a range of the ratio in mass % of $P_2O_5/Al_2O_3$.

In a case where the ratio in mass % of $P_2O_5/Al_2O_3$ is 0.330 or below, a preferable range of crystallization temperature is 750° C. at the lowest and less than 770° C. at the highest.

In a case where the ratio in mass % of $P_2O_5/Al_2O_3$ exceeds 0.330, a preferable range of crystallization temperature is 770° C. at the lowest and 790° C. at the highest.

For preventing aggregation and excessive growth of crystals and thereby obtaining fine crystals with a small crystal grain diameter distribution, time length for the heat treatment for crystal growth should preferably be 100 hours to 200 hours. A lower limit of more preferable time length for the heat treatment for crystal growth is 105 hours and a lower limit of the most preferable time length for this purpose is 108 hours. Likewise, an upper limit of more preferable time length for the heat treatment for crystal growth is 180 hours and an upper limit of the most preferable time length for this purpose is 160 hours.

By taking such long time as compared with the conventional method for the heat treatment in the vicinity of the lowest temperature for the heat treatment for crystal growth which each composition of glass-ceramics has, a fine average crystal grain diameter of precipitating crystals can be realized and moreover crystal grain diameter distribution of the precipitating crystals within a desired range can be realized. Since ultra low thermal expansion property of the material is proportional to the amount of crystal phase precipitating, crystallization must be enhanced for achieving the ultra low thermal expansion property. If, however, crystallization is advanced simply under a higher crystallization temperature than the above described temperature, crystallization is enhanced and the ultra low thermal expansion property can be achieved but a precise and fine control for preventing aggregation and excessive growth of crystals is difficult to realize. As in the present invention, by fixing the crystallization temperature within the above described range and setting time length for crystallization within the above described specific range of long time, aggregation and excessive growth of crystals can be prevented and fine crystals with a small crystal grain diameter distribution thereby can be achieved.

Further, a mask, an optical system reflecting mirror, a wafer stage, a reticle stage and a part for a precision instrument are produced by forming the glass-ceramics to a desired shape and subjecting the glass-ceramics to lapping and polishing processes according to the necessity.

EXAMPLES

Examples of the present invention will now be described. The invention however is not limited by these examples. Tables 1, 2 and 3 show examples of compositions (Example No. 1 to Example No. 6) of the ultra low thermal expansion transparent glass-ceramics of the present invention and compositions of the comparative examples, namely prior art $Li_2O—Al_2O_3—SiO_2$ low expansion glass-ceramics (Comparative Example No. 1 to Comparative Example No. 10) together with their crystallization temperature and time length (nucleation holding and crystal growth holding), average crystal grain diameter, crystal grain diameter distribution, surface roughness (Rms) after polishing, average linear thermal expansion coefficient within the temperature range from 0° C. to 50° C. The compositions of the respective examples and comparative examples are shown in mass %.

Figure 2:
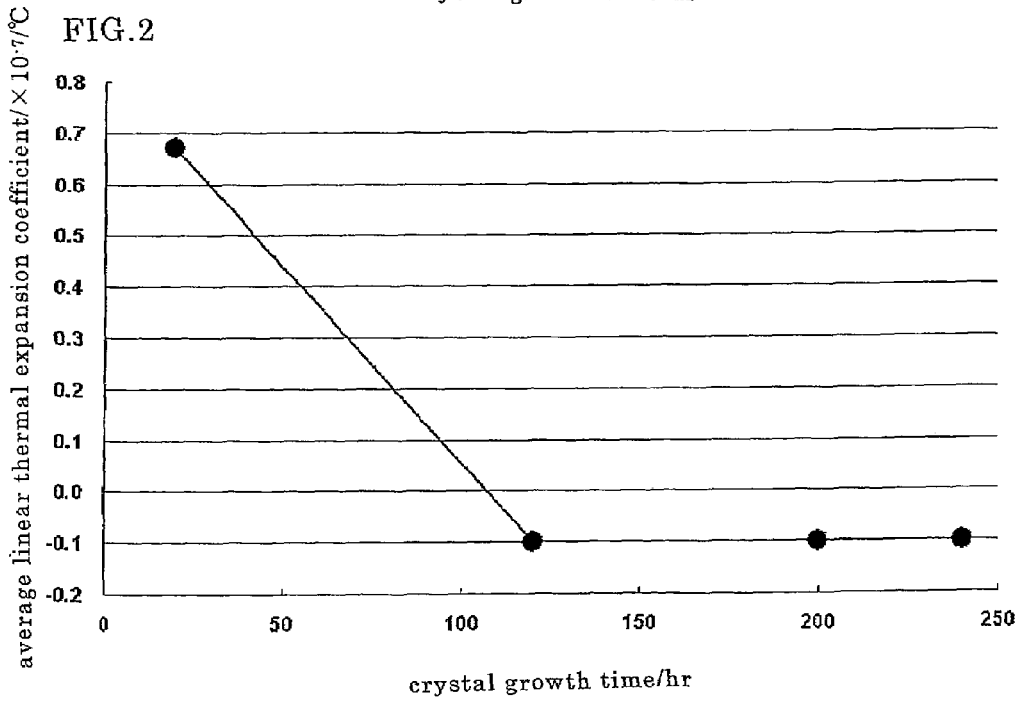
FIG. 2 is a graph showing relationship between crystallization time and average linear thermal expansion coefficient of the composition of glass-ceramics of Example 1.
Figure 3:
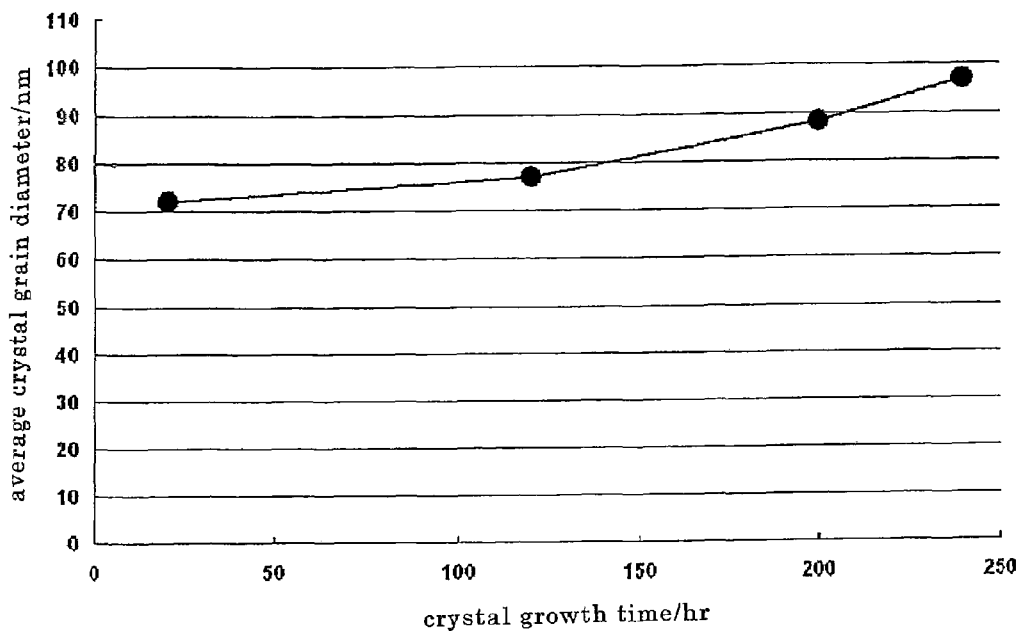
FIG. 3 is a graph showing relationship between crystallization time and average crystal grain diameter of the composition of glass-ceramics of Example 1.
Figure 4:
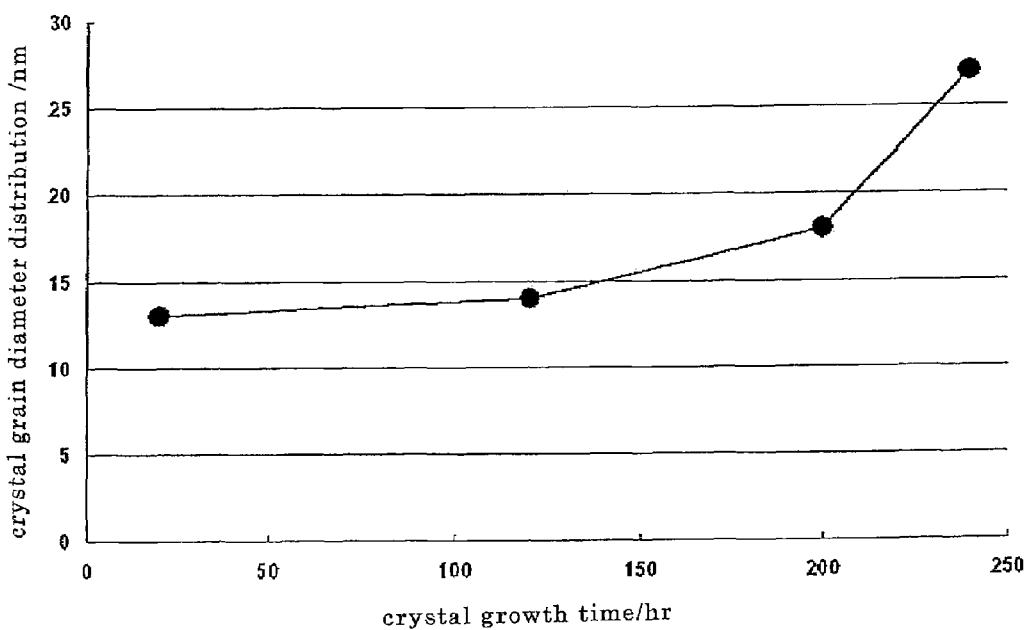
FIG. 4 is a graph showing relationship between crystallization time and crystal grain diameter distribution of the composition of glass-ceramics of Example 1.
Figure 5:
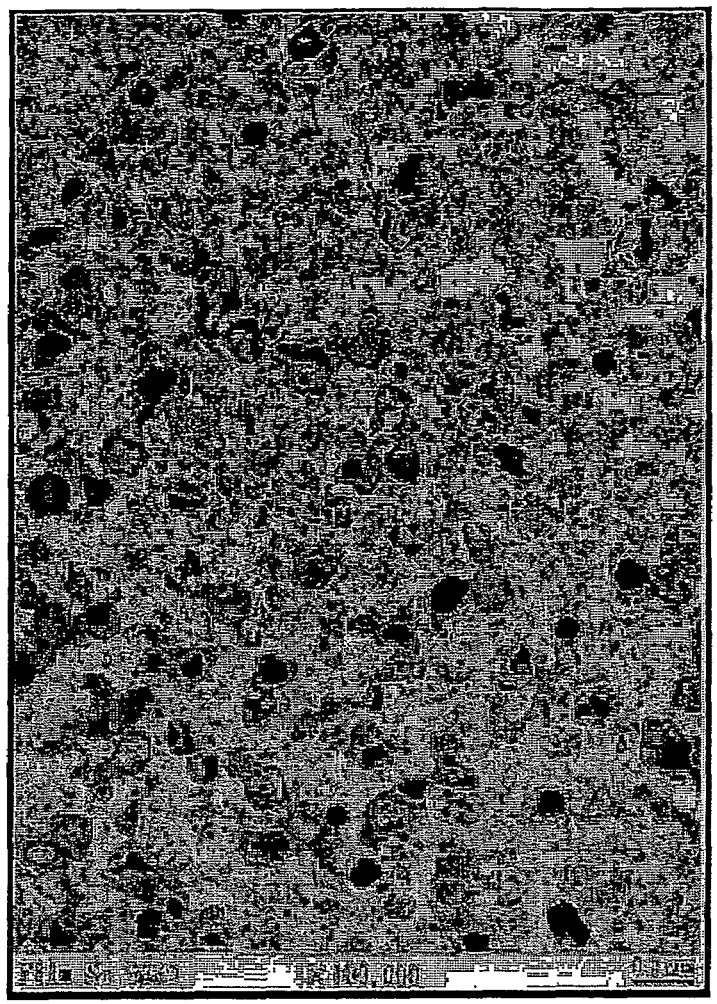
FIG. 5 is a photograph of microstructure of the glass-ceramics of Example 1 observed by a transmission electron microscope.
Figure 6:
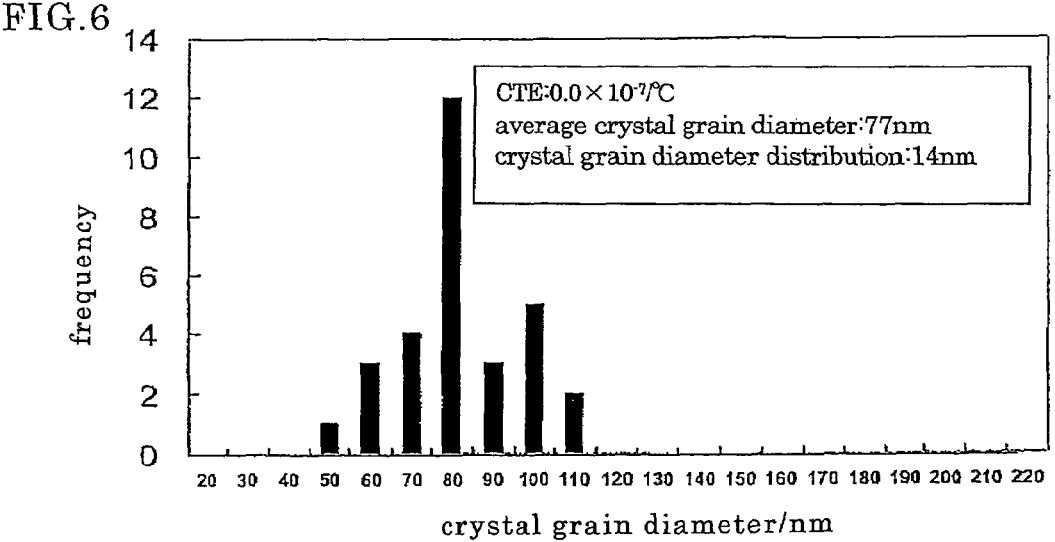
FIG. 6 is a histogram of crystal grain diameter distribution of Example 1.
Figure 7:
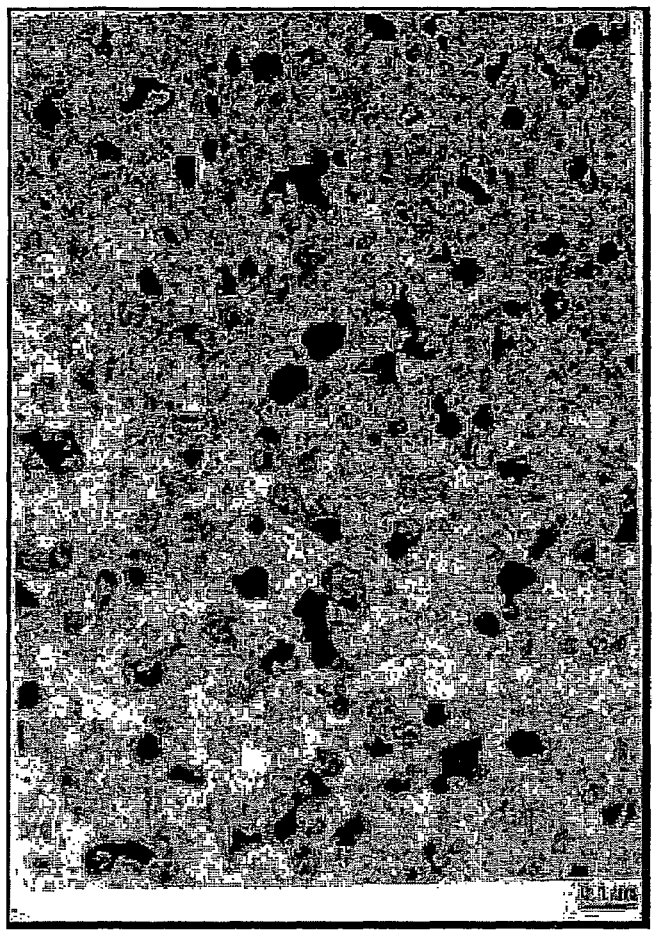
FIG. 7 is a photograph of microstructure of glass-ceramics of Comparative Example 1 observed by a transmission electron microscope.
Figure 8:
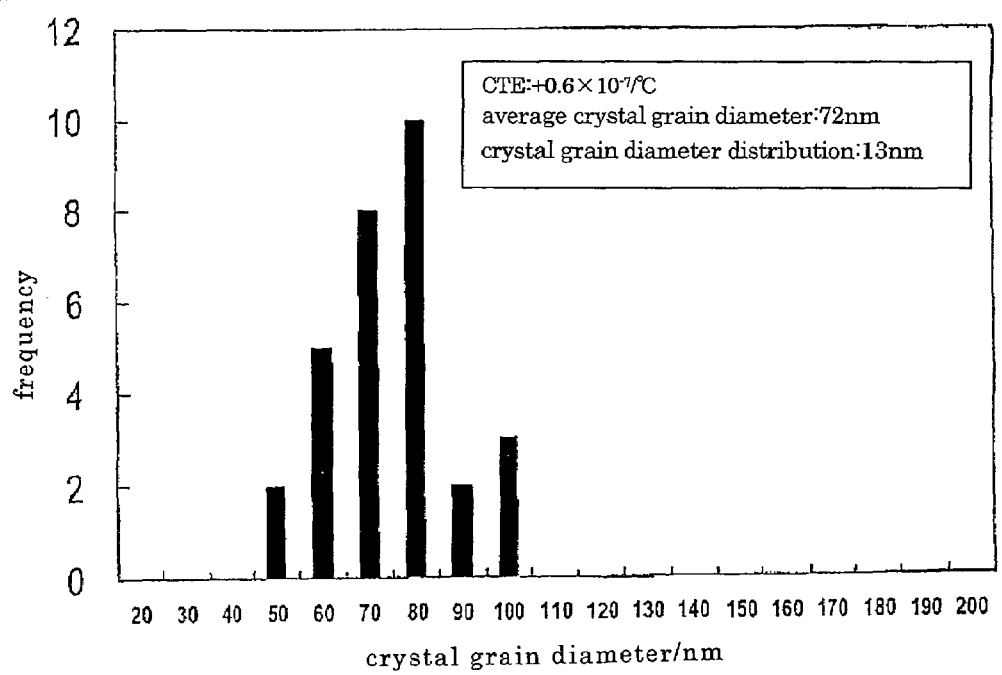
FIG. 8 is a histogram of crystal grain diameter distribution of Comparative Example 1.
Figure 9:
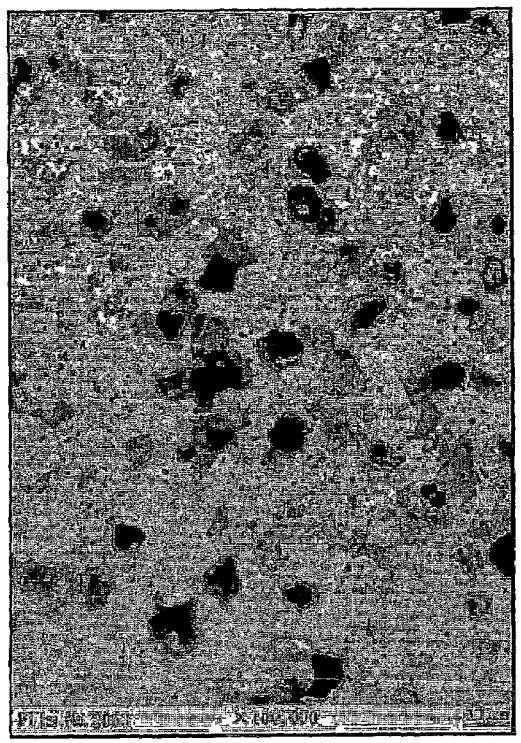
FIG. 9 is a photograph of microstructure of glass-ceramics of Comparative Example 2 observed by a transmission electron microscope.
Figure 10:
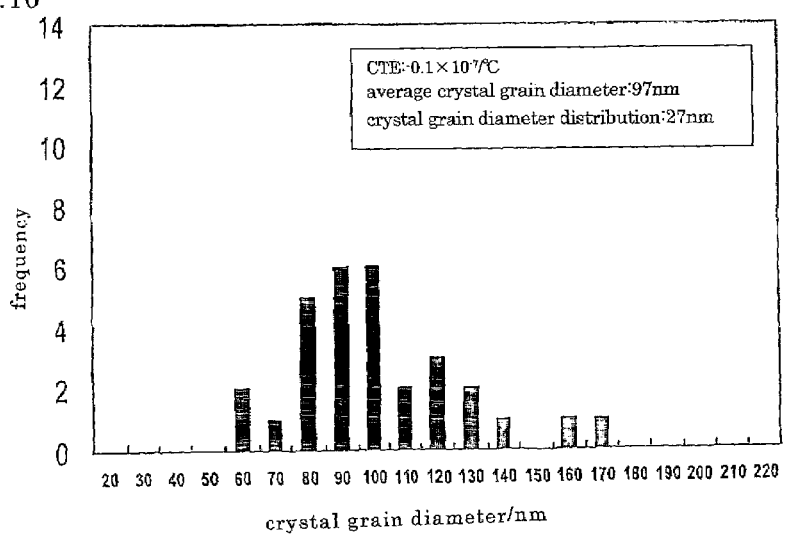
FIG. 10 is a histogram of crystal grain diameter distribution of Comparative Example 2.

FIG. 1 shows relationship between crystallization time and surface roughness Rms of the composition of glass-ceramics of Example No. 1. FIG. 2 shows relationship between crystallization time and average linear thermal expansion coefficient (0-50° C.) of the composition of glass-ceramics of Example No. 1. FIG. 3 shows relationship between crystallization time and average crystal grain diameter of the composition of glass-ceramics of Example No. 1. FIG. 4 shows relationship between crystallization time and crystal grain diameter distribution of the composition of glass-ceramics of Example No. 1. FIGS. 5, 7 and 9 are photographs of microstructure of the glass-ceramics of Example No. 1, and Comparative Example Nos. 1 and 2 observed by a transmission electron microscope. FIGS. 6, 8 and 10 are histograms of crystal grain diameter distribution of Example No. 1 and Comparative Example Nos. 1 and 2 obtained from the transmission electron microscope photographs.

For producing the glass-ceramics of these examples, raw materials such as oxides, carbonates and nitrates were mixed together and melted at a temperature of about 1450° C. to 1550° C. and stirred for homogenization and thereafter were formed to a desired shape and cooled to provide a formed glass. Then, this formed glass was heat treated at a temperature of 650° C. to 750° C. for 40 hours for nucleation and thereafter heat treated at a temperature of 700° C. to 800° C. for 100 hours to 200 hours for crystallization to provide desired glass-ceramics. The glass-ceramics were then subjected to lapping and polishing as a finishing process.

The surface roughness Rms of the glass-ceramics was measured by using NanoScope 3A D3000 atomic force microscope made by Nihon Veeco K.K.

The average linear thermal expansion coefficient was measured by using a Fizeau interferometer type precision expansion measuring instrument.

The test portion was in the form of a cylinder having a diameter of 30 mm and length of about 27 mm.

For measuring the thermal expansion coefficient, the test portion was placed in a furnace capable of controlling temperature with an optical flat plate in contact with opposite surfaces of the test portion to enable observation of interference fringes caused by a HeNe laser. Then, the temperature of the test portion was varied to observe change in the interference fringes and thereby measure the amount of change in the length of the test portion with the change in the temperature. In actual measurement, the test portion was measured under conditions of rising temperatures and falling temperatures and an average of the amount of change in the length of the test portion under the two conditions was used as $\Delta L$.

For calculating the average linear thermal expansion coefficient, the following formula was employed to calculate the average linear thermal expansion coefficient $\alpha(/° C.)$:

$$\alpha=(\Delta L/L)/\Delta T$$

where $\alpha$ represents average linear thermal expansion coefficient, $\Delta T$ range of temperature in which the measurement is made and L length of the test portion.

As shown in Table 1 and FIGS. 1 through 4, the ultra low thermal expansion transparent glass-ceramics of the present invention made under the specific composition and crystallization conditions have the fine and uniform crystal grain diameter of 90 nm or below and crystal grain diameter distribution of 20 nm or below and an excellent flat surface with the surface roughness Rms after polishing based on spatial wavelength of 10 μm or below being 0.2 nm or below. The glass-ceramics of the present invention also exhibit an ultra low thermal expansion property with the average linear thermal expansion coefficient of $0\pm0.2\times10^{-7}/° C.$ within the range from 0° C. to 50° C.

Comparative Example Nos. 4-10 of Tables 2 and 3 have an average crystal grain diameter of 90 nm or below and an average linear thermal expansion coefficient within a range of $0\pm0.2\times10^{-7}/° C.$ but their crystal grain diameter distribution exceeds 20 nm and, as a result, surface roughness Rms after polishing exceeds 0.2 nm.

TABLE 1

| mass % | Examples | | | | | |
|---|---|---|---|---|---|---|
| | 1 | 2 | 3 | 4 | 5 | 6 |
| $SiO_2$ | 55.00 | 55.50 | 56.20 | 54.5 | 55.3 | 55.8 |
| $P_2O_5$ | 8.00 | 7.50 | 7.00 | 8.3 | 6.8 | 6.5 |
| $Al_2O_3$ | 24.00 | 24.50 | 25.00 | 24.00 | 25.00 | 23.50 |
| $Li_2O$ | 4.00 | 3.95 | 3.40 | 3.80 | 4.0 | 4.0 |
| $Na_2O$ | — | — | 0.10 | | | 0.20 |
| $K_2O$ | — | — | 0.50 | | | 0.40 |
| MgO | 1.00 | 1.00 | 1.10 | 1.30 | 1.00 | 1.20 |
| CaO | 1.00 | 1.05 | — | 1.20 | | 1.00 |
| BaO | 1.00 | 1.00 | — | 1.20 | | 1.00 |
| ZnO | 0.50 | 0.50 | 1.20 | 1.00 | 1.00 | 0.40 |
| $TiO_2$ | 2.50 | 2.30 | 2.30 | 2.00 | 2.80 | 2.50 |
| $ZrO_2$ | 2.00 | 2.00 | 1.70 | 2.00 | 2.80 | 2.50 |
| $As_2O_3$ | 1.00 | 0.70 | 0.80 | 0.70 | 1.30 | 1.00 |
| nucleation temperature/° C. | 700 | 700 | 700 | 700 | 700 | 700 |
| nucleation time/hr | 40 | 40 | 40 | 40 | 40 | 40 |
| crystal growth temperature/° C. | 780 | 760 | 760 | 780 | 755 | 755 |
| crystal growth time/hr | 120 | 110 | 150 | 180 | 140 | 150 |

TABLE 1-continued

| mass % | Examples | | | | | |
|---|---|---|---|---|---|---|
| | 1 | 2 | 3 | 4 | 5 | 6 |
| average crystal grain diameter/nm | 77 | 68 | 80 | 83 | 75 | 98 |
| crystal grain diameter distribution/nm | 14 | 13 | 16 | 15 | 17 | 18 |
| surface roughness (Rms) of polished surface/nm | 0.15 | 0.13 | 0.20 | 0.12 | 0.16 | 0.17 |
| average linear thermal expansion coefficient/ $\times 10^{-7}/°$ C. (0° C.~+50° C.) | 0.0 | +0.2 | −0.1 | −0.1 | +0.0 | −0.2 |

TABLE 2

| mass % | Comparative Examples | | | | | |
|---|---|---|---|---|---|---|
| | 1 | 2 | 3 | 4 | 5 | 6 |
| $SiO_2$ | 55.00 | 55.00 | 56.20 | 55.00 | 55.50 | 55.50 |
| $P_2O_5$ | 8.00 | 8.00 | 7.00 | 7.60 | 7.50 | 7.60 |
| $Al_2O_3$ | 24.00 | 24.00 | 25.00 | 24.40 | 24.50 | 24.40 |
| $Li_2O$ | 4.00 | 4.00 | 3.40 | 4.00 | 3.95 | 3.95 |
| $Na_2O$ | — | — | 0.10 | | | |
| $K_2O$ | — | — | 0.50 | | | |
| MgO | 1.00 | 1.00 | 1.10 | 1.00 | 1.00 | 1.00 |
| CaO | 1.00 | 1.00 | — | 1.00 | 1.05 | 1.05 |
| BaO | 1.00 | 1.00 | — | 1.00 | 1.00 | 1.00 |
| ZnO | 0.50 | 0.50 | 1.20 | 0.50 | 0.50 | 0.50 |
| $TiO_2$ | 2.50 | 2.50 | 2.30 | 2.50 | 2.30 | 2.30 |
| $ZrO_2$ | 2.00 | 2.00 | 1.70 | 2.00 | 2.00 | 2.00 |
| $As_2O_3$ | 1.00 | 1.00 | 0.80 | 1.00 | 0.70 | 0.70 |
| nucleation temperature/° C. | 700 | 700 | 700 | 700 | 700 | 700 |
| nucleation time/hr | 40 | 40 | 40 | 10 | 10 | 10 |
| crystal growth temperature/° C. | 780 | 780 | 780 | 780 | 770 | 770 |
| crystal growth time/hr | 5 | 240 | 300 | 12 | 10 | 12 |
| average crystal grain diameter/nm | 72 | 97 | 115 | 50 | 70 | 70 |
| crystal grain diameter distribution/nm | 13 | 27 | 33 | 25 | 25 | 25 |
| surface roughness (Rms) of polished surface/nm | 0.15 | 0.25 | 0.35 | 0.25 | 0.23 | 0.25 |
| average linear thermal expansion coefficient/ $\times 10^{-7}/°$ C. (° C.~+50° C.) | +0.6 | −0.1 | −0.8 | +0.02 | +0.04 | +0.03 |

TABLE 3

| mass % | Comparative Examples | | | |
|---|---|---|---|---|
| | 7 | 8 | 9 | 10 |
| $SiO_2$ | 55.50 | 55.50 | 55.50 | 55.50 |
| $P_2O_5$ | 7.55 | 7.60 | 7.35 | 7.50 |
| $Al_2O_3$ | 24.45 | 24.40 | 24.65 | 24.50 |
| $Li_2O$ | 3.95 | 3.97 | 3.95 | 3.95 |
| $Na_2O$ | | | | |
| $K_2O$ | | | | |
| MgO | 1.00 | 1.00 | 1.00 | 1.00 |
| CaO | 1.05 | 1.03 | 1.05 | 1.00 |
| BaO | 1.00 | 1.00 | 1.00 | 1.05 |
| ZnO | 0.50 | 0.50 | 0.50 | 0.50 |
| $TiO_2$ | 2.30 | 2.30 | 2.30 | 2.30 |
| $ZrO_2$ | 2.00 | 2.00 | 2.00 | 2.00 |
| $As_2O_3$ | 0.70 | 0.70 | 0.70 | 0.70 |

TABLE 3-continued

| mass % | Comparative Examples | | | |
|---|---|---|---|---|
| | 7 | 8 | 9 | 10 |
| nucleation temperature/° C. | 700 | 700 | 700 | 700 |
| nucleation time/hr | 10 | 10 | 10 | 10 |
| crystal growth temperature/° C. | 780 | 785 | 780 | 785 |
| crystal growth time/hr | 10 | 5 | 10 | 1 |
| average crystal grain diameter/nm | 60 | 50 | 80 | 90 |
| crystal grain diameter distribution/nm | 25 | 30 | 25 | 30 |
| surface roughness (Rms) of polished surface/nm | 0.25 | 0.30 | 0.25 | 0.30 |
| average linear thermal expansion coefficient/ $\times 10^{-7}/°$ C. (0° C.~+50° C.) | −0.02 | +0.06 | +0.08 | +0.04 |

The glass-ceramics of the present invention are suitable for use not only as substrates of the EUVL mirror and EUVL photo mask but also as substrates of an astronomical telescope mirror, precision measuring instruments and ring laser gyroscope for which both the ultra low thermal expansion property and super flat polished surface are required.

What is claimed is:

1. Glass-ceramics comprising $Li_2O$, $Al_2O_3$ and $SiO_2$, comprising β-quartz and/or β-quartz solid solution as a predominant crystal phase, having an average crystal grain diameter of a predominant crystal phase of 90 nm or below and having crystal grain diameter distribution of 20 nm or below, and further having an average linear thermal expansion coefficient within a range of $0.0 \pm 0.2 \times 10^{-7}/°$ C. within a temperature range from 0° C. to 50° C., wherein crystal grain diameter distribution means standard deviation of crystal grain diameters having visual calculation constant of 30 or more obtained by visual inspection of crystal grains of a transmission electron microscopic photograph.

2. Glass-ceramics as defined in claim 1 wherein a surface roughness Rms of a polished surface based on spatial wavelength of 10 μm or below is 0.2 nm or below.

3. Glass-ceramics as defined in claim 1 comprising, in mass %,

| | |
|---|---|
| $SiO_2$ | 47-65% |
| $P_2O_5$ | 1-13% |
| $Al_2O_3$ | 17-29% |
| $Li_2O$ | 1-8% |
| MgO | 0.5-5% |
| ZnO | 0.5-5.5% |
| $TiO_2$ | 1-7% and |
| $ZrO_2$ | 1-7%. |

4. Glass-ceramics as defined in claim 3 comprising, in mass %,

| | |
|---|---|
| $Na_2O$ | 0-4% and/or |
| $K_2O$ | 0-4% and/or |
| CaO | 0-7% and/or |
| BaO | 0-7% and/or |
| SrO | 0-4% and/or |

-continued

| | |
|---|---|
| As₂O₃ | 0-2% and/or |
| Sb₂O₃ | 0-2%. |

5. Glass-ceramics as defined in claim 1 wherein a total amount of $SiO_2+Al_2O_3+P_2O_5$ in mass % is within a range from 65.0 to 93.0, the ratio of $P_2O_5/SiO_2$ is within a range from 0.02 to 0.200 and the ratio of $P_2O_5/Al_2O_3$ is within a range from 0.059 to 0.448.

6. Glass-ceramics as defined in claim 1 obtained by heat treating glass under a temperature within a range from 650° C. to 750° C. and then further heat treating the glass for second heat treatment under a temperature within a range from 700° C. to 800° C. for 100-200 hours.

7. Glass-ceramics as defined in claim 6 obtained by heat treating glass for first heat treatment under a temperature within a range from 650° C. to 750° C. for 20-60 hours and then further heat treating the glass for second heat treatment under a temperature within a range from 700° C. to 800° C. for 100-200 hours.

8. A substrate using the glass-ceramics as defined in any of claims 1 and 2-7.

9. A photo-mask using the substrate as defined in claim 8.

10. A mirror using the substrate as defined in claim 8.

11. Glass-ceramics as defined in claim 2 wherein the average crystal grain diameter of the predominant crystal phrase is 70 nm or below; the crystal grain distribution is 15 nm or below; the average linear range thermal expansion coefficient is within a range of $0.0\pm0.1\times10^{-7}/°$ C. within a temperature range from 0° C. to 50° C. and the surface roughness Rms of the polished surface based on spatial wavelength of 10 μm or below is 0.15 nm or below.

* * * * *